(No Model.)
J. D. EDWARDS.
CLEVIS.
No. 306,389. Patented Oct. 14, 1884.
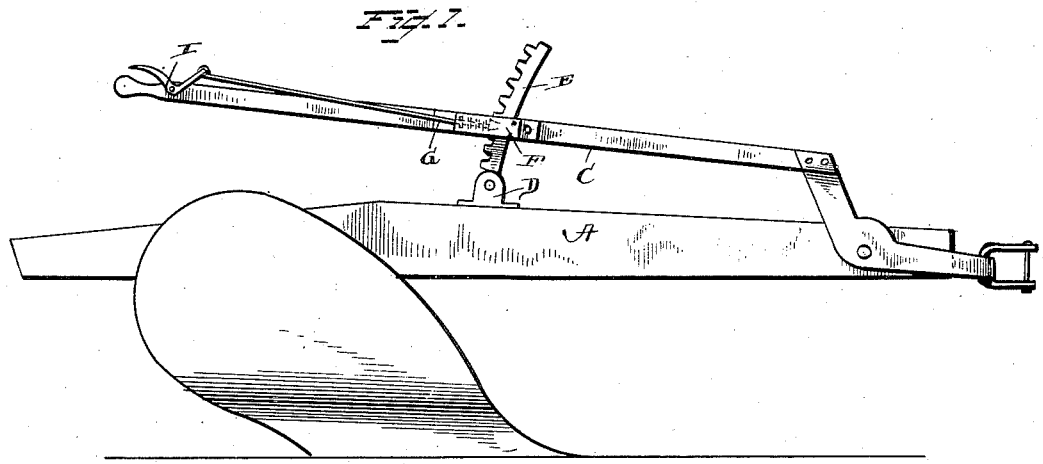
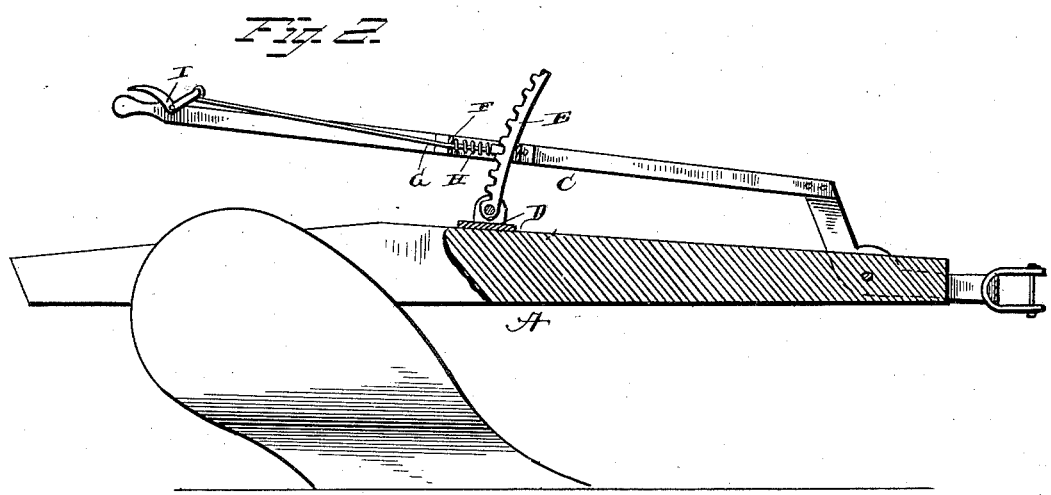
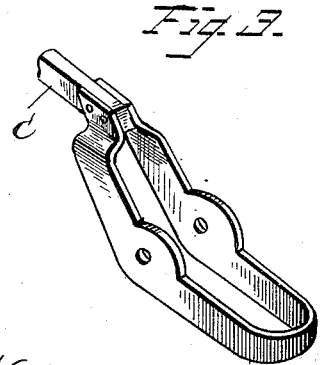
WITNESSES
F. L. Ourand
E. J. Siggers
J. D. Edwards
INVENTOR
by C. A. Snow & Co.
Attorneys

UNITED STATES PATENT OFFICE.

JOHN D. EDWARDS, OF ROCHESTER, INDIANA, ASSIGNOR OF TWO-THIRDS TO FRANK N. HOFFMAN AND WILLIAM W. McMAHAN, BOTH OF SAME PLACE.

CLEVIS.

SPECIFICATION forming part of Letters Patent No. 306,389, dated October 14, 1884.

Application filed April 29, 1884. (No model.)

*To all whom it may concern:*

Be it known that I, JOHN D. EDWARDS, a citizen of the United States, residing at Rochester, in the county of Fulton and State of Indiana, have invented a new and useful Clevis, of which the following is a specification, reference being had to the accompanying drawings.

My invention relates to a clevis designed for use particularly on plows; and it has for its object to provide a device of this character whereby the line of draft may be regulated to vary the depth of the furrow.

A further object of the invention is to provide a device for this purpose which shall be cheap and simple in its construction and thoroughly effective in its operation.

With these ends in view the invention consists in the improved construction and combinations of parts hereinafter fully described, and pointed out in the claims.

In the drawings, Figure 1 is a side elevation of a sufficient portion of a plow to illustrate the application of my improvement. Fig. 2 is a longitudinal section, and Fig. 3 is a perspective view, of the bail to which the doubletree is attached.

In the accompanying drawings, in which like letters refer to corresponding parts in the several figures, A represents a plow, which may be of any ordinary construction. To the forward end of the plow-beam is pivoted, at about its center, a bail, which is slightly angular in form, being bent outwardly from the point at which it is pivoted to the plow-beam. The rear end of this bail is split, and the adjacent ends turned upwardly to form ears *a*, between which is rigidly secured the forward end of a lever, C. At about the center of the plow-beam, and on the upper side thereof, is secured a bracket, D, between the arms of which is pivoted a segmental rack bar or plate, E. Upon the side of the lever C adjacent to the segmental rack bar or plate E is provided a bracket, F, having an opening in its forward end for the passage of rod G. Upon the end of this rod is mounted a coil-spring, H, which bears against the inner end of the bracket at one end and against a pin on said rod at its other end. The end of this rod is adapted to engage the segmental bar or plate which is located in this bracket, and in such manner that the lever and rod may be moved vertically on the same.

I represents a bell-crank lever, which is pivoted to the forward end of the lever C and connected with the rod G, in order that the same may be operated to disengage the same from the rack-bar to raise or lower the bail on the end of the plow-beam.

The operation is as follows: The doubletree being attached to the bail at the forward end of the plow and the plow drawn forward, if at any time it is found necessary to make a deeper furrow, the bail on the end of the plow-beam is raised by means of the lever, said lever being disengaged from the rack-bar by means of the bell-crank lever and the rod connected thereto. To plow a shallow furrow, the bail on the end of the plow-beam is lowered, from which it will be seen that the depth of the furrow may be regulated.

Having fully described my invention, what I claim as new, and desire to secure by Letters Patent, is—

1. The combination, with a plow-beam having an angular clevis-bail secured at its forward end, and provided at about its center with a pivoted segmental rack-plate, of a lever rigidly secured to said bail, and having a spring-pressed rod to engage said rack-plate, substantially as set forth.

2. The combination, with a plow-beam having an angular clevis-bail secured at its forward end, and provided at about its center with a pivoted segmental rack-plate, of a lever rigidly secured to said bail, and having a bracket adapted to receive said rack-plate, a bell-crank lever pivoted to the rear end of the handle or lever, a rod secured to said bell-crank lever and adapted to engage the teeth of the segmental rack-plate, and a coil-spring mounted on the end of said rod within the bracket, substantially as set forth.

In testimony that I claim the foregoing as my own I have hereto affixed my signature in presence of two witnesses.

JOHN D. EDWARDS.

Witnesses:
ENOCH MYERS,
ISAIAH CONNER.